May 5, 1936. B. ADLER 2,039,869
SYNCHRONIZING SYSTEM
Filed June 27, 1929
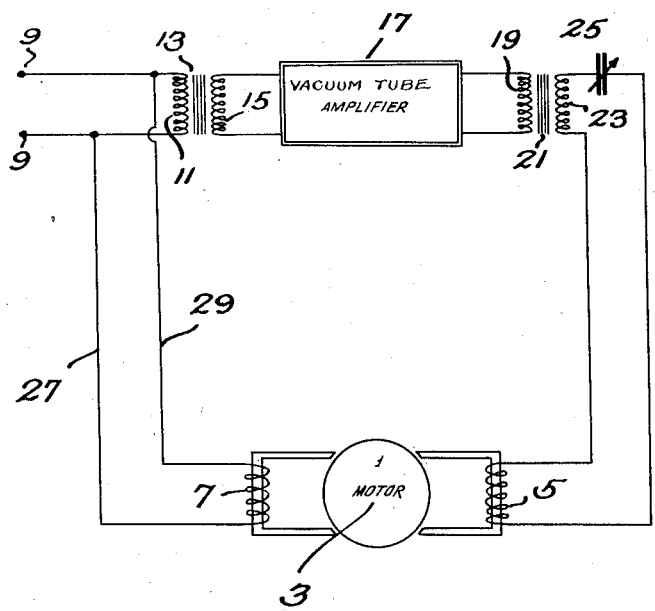
INVENTOR
BENJAMIN ADLER
BY
ATTORNEY Patented May 5, 1936

2,039,869

UNITED STATES PATENT OFFICE 2,039,869

SYNCHRONIZING SYSTEM

Benjamin Adler, Whitestone, N. Y., assignor to Radio Corporation of America, a corporation of Delaware Application June 27, 1929, Serial No. 374,051

1 Claim. (Cl. 172—293)

The present invention is particularly directed to synchronizing systems, and, more particularly, to a method and means by which a small synchronous motor may be brought up to speed and to improve the operating characteristics when the motor is driven from the output of a vacuum tube circuit.

Broadly considering, the invention is directed to a method and means by which impulses may be applied through an amplifier for the purpose of holding in synchronism a synchronous motor, and a means by which impulses generated in a generating coil forming a part of the synchronous motor may, in turn, be utilized for the purpose of bringing up to speed and driving the synchronous motor.

Broadly, the system consists in the use of an alternating current motor which may be equipped with a generator coil which is independent of the motor coil, meaning that the generator coil is in no sense electrically coupled to the motor coil. As will hereinafter appear, the generator coil may be connected to the input of a vacuum tube amplifier circuit whose output is connected with the motor coil for driving the motor.

As a principal object of my invention, I have, therefore, sought to provide a method and means by which synchronous motors may be brought up to speed and when synchronous speed is attained the motor will lock at this speed of its own accord.

Still other objects of my invention are to provide a method and means for synchronizing moving elements which is simple in its construction and arrangement of parts, a system which is cheap, conveniently installed, readily set up, easily operated, and readily capable of attaining the objects and advantages which I have sought.

Still other and ancillary objects of my invention will hereinafter appear and at once suggest themselves to those skilled in the art to which the invention relates by reading the following description and claim in connection with the accompanying drawing, wherein, the single figure thereof schematically illustrates one general form of arrangement which my invention may assume.

Now to refer more particularly to the drawing, the synchronous motor which is preferably of the variable reluctance type is generally designated as 1, and provided with a rotor 3. The motor coil 5 is provided for driving the motor, and the generator coil 7 is provided for picking up energy impulses generated from the rotation of said motor.

Synchronizing impulses may be applied to the terminals 9—9 as output energy from any desired type of receiving system, such as, for example, a television receiver in which the synchronizing signal has been filtered by any appropriate and well known means, or, for example, may be a synchronizing signal as supplied from power mains, such as, for example, a 60 cycle A. C. main. The synchronizing energy applied to the terminals 9—9 may then be fed through the primary winding 11 of a transformer 13 and picked up by the secondary winding thereof 15 and fed to a vacuum tube amplifier, conventionally designated 17. The output of the vacuum tube amplifier is fed to the primary winding 19 of a transformer 21 where it is transferred to the secondary winding 23, and through the circuit including the secondary winding 23 of the transformer, the motor coil 5, and a capacitor 25, the output energy of the vacuum tube amplifier is arranged to drive the synchronous motor 1.

As the motor 1 is rotated energy of a frequency gradually increasing as the motor speed increases is generated in the generator coil 7 from which it is transferred through the leads 27 and 29 so as to be superimposed upon the initially supplied impulses which were directed through the primary winding 11 of the transformer 13. Thus, it is apparent that energy of both the supplied frequency for synchronizing the synchronous motor and also energy of a frequency proportionate to the speed of the synchronous motor is applied through the amplifier system 17 and, in turn, directed to the motor coil 5 so as to drive the motor.

The arrangement above described is such that at standstill, with the synchronizing frequency removed, no energy is fed to the input of the vacuum tube circuit, but if the motor is given a start, in any appropriate manner, the voltage generated across the generator coil is applied to this input, and is then amplified in the vacuum tube amplifier and applied to the motor. The effect thus derived is to produce rotation of gradually increasing speed, and the speed will increase until the frequency of the generator voltage as generated in the generator coil 7 is equal to the frequency to which the vacuum tube circuit is tuned. The rotating speed of the motor 1 may be controlled by varying the capacity member 25 in series with the motor circuit, and it will readily appear that the upper limit of speed is determined by the power available from the vacuum tube circuit and the mechanical limitations of the motor.

The device herein described can be used as a synchronous motor by applying a small voltage of the frequency that it is desired to keep the motor in step with, as above described, to the input of the amplifier, along with the generated voltage. If the motor circuit, including the secondary winding 23 of the transformer 21, the capacitor 25, and the motor coil 5, is tuned to this frequency, the motor will lock in step and run as a synchronous motor. Such an arrangement provides a device which when used in this manner serves as a synchronous motor that will pull up to a synchronous speed and then lock at this speed of its own accord after it has been given an initial start.

Other modifications and changes in the invention herein described will at once suggest themselves and become apparent to those skilled in the art to which the invention relates, and I, therefore, believe myself to be entitled to make any and all modifications such as fall fairly within the spirit and scope of the invention as set forth in the hereinafter appended claim.

Having now described my invention, what I claim as new and desire to secure by Letters Patent is the following:

In a synchronizing system, an alternating current motor having electrically independent motor and generator coils associated therewith, a vacuum tube amplifying circuit, means for connecting the output of said vacuum tube amplifying system with the motor coil of said motor for supplying amplified driving current impulses thereto, means for tuning said motor energy supply circuit to desired frequencies to provide a maximum energy transfer to the motor coil, means for connecting the said generator coil of said motor with the input of said vacuum tube amplifier for regenerating impulses generated in said motor and applying the said impulses to drive the said motor, and means for supplying correction impulses having substantially the same frequency to which said motor energy supply circuit is tuned to the amplifier input simultaneously with the generator impulses to synchronize the motor.

BENJAMIN ADLER.